US012620059B2

(12) United States Patent
Liu et al.

(10) Patent No.: US 12,620,059 B2
(45) Date of Patent: May 5, 2026

(54) METHOD AND DEVICE FOR DEEP GUIDED FILTER PROCESSING

(71) Applicant: Samsung Electronics Co., Ltd., Suwon-si (KR)

(72) Inventors: Qingfeng Liu, San Diego, CA (US); Hai Su, San Diego, CA (US); Mostafa El-Khamy, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 558 days.

(21) Appl. No.: 17/563,012

(22) Filed: Dec. 27, 2021

(65) Prior Publication Data

US 2022/0301128 A1 Sep. 22, 2022

Related U.S. Application Data

(60) Provisional application No. 63/224,312, filed on Jul. 21, 2021, provisional application No. 63/190,128, (Continued)

(51) Int. Cl.
*G06T 5/20* (2006.01)
*G06T 3/403* (2024.01)
(Continued)

(52) U.S. Cl.
CPC .............. *G06T 5/20* (2013.01); *G06T 3/403* (2013.01); *G06T 7/12* (2017.01); *G06V 10/443* (2022.01);
(Continued)

(58) Field of Classification Search
CPC .. G06T 5/20; G06T 3/403; G06T 7/12; G06T 2207/20021; G06T 2207/20081;
(Continued)

(56) References Cited

U.S. PATENT DOCUMENTS 10,671,855 B2 6/2020 Lee et al.
10,860,919 B2 12/2020 Kanazawa et al.
(Continued)

FOREIGN PATENT DOCUMENTS

CN 110809784 A 2/2020
CN 111612791 A 9/2020
(Continued)

OTHER PUBLICATIONS

Wu, Huikai et al., "Fast End-to-End Trainable Guided Filter", Proceedings of the IEEE Conference on Computer Vision and Pattern Recognition, 2018, 10 pages.

*Primary Examiner* — Jennifer Mehmood
*Assistant Examiner* — Heath E. Wells
(74) *Attorney, Agent, or Firm* — Renaissance IP Law Group LLP

(57) ABSTRACT

A method of image processing includes: determining a first feature, wherein the first feature has a dimensionality D1; determining a second feature, wherein the second feature has a dimensionality D2 and is based on an output of a feature extraction network; generating a third feature by processing the first feature, the third feature having a dimensionality D3; generating a guidance by processing the second feature, the guidance having the dimensionality D3; generating a filter output by applying a deep guided filter (DGF) to the third feature using the guidance; generating a map based on the filter output; and outputting a processed image based on the map.

18 Claims, 9 Drawing Sheets

Related U.S. Application Data filed on May 18, 2021, provisional application No. 63/161,827, filed on Mar. 16, 2021.

(51) Int. Cl.
*G06T 7/12* (2017.01)
*G06V 10/44* (2022.01)
*G06V 20/70* (2022.01)

(52) U.S. Cl.
CPC .... *G06V 20/70* (2022.01); *G06T 2207/20021* (2013.01); *G06T 2207/20081* (2013.01)

(58) Field of Classification Search
CPC ............. G06T 5/60; G06T 2207/20012; G06T 2207/20084; G06T 7/11; G06T 5/70; G06V 10/443; G06V 20/70; G06V 10/30; G06V 10/454; G06N 3/04; G06N 3/082
USPC .......................................................... 382/190
See application file for complete search history.

(56) References Cited

U.S. PATENT DOCUMENTS

| | | | |
|---|---|---|---|
| 11,113,800 | B2 | 9/2021 | Kaplanyan et al. |
| 11,176,672 | B1 | 11/2021 | Takahashi et al. |
| 11,238,596 | B1 * | 2/2022 | Gadde .................. G06V 30/274 |
| 2015/0016720 | A1 | 1/2015 | Vermeir |
| 2018/0260956 | A1 * | 9/2018 | Huang ................... G06V 20/56 |
| 2020/0160533 | A1 * | 5/2020 | Du .......................... G06T 7/593 |
| 2020/0175352 | A1 | 6/2020 | Cha et al. |
| 2020/0302612 | A1 | 9/2020 | Marrero et al. |
| 2021/0081681 | A1 * | 3/2021 | Chiba ...................... G08G 1/09 |
| 2021/0082118 | A1 | 3/2021 | Zhang et al. |
| 2022/0100935 | A1 * | 3/2022 | Chen ...................... G06F 30/30 |
| 2022/0122224 | A1 * | 4/2022 | Perazzi .................... G06T 5/70 |
| 2022/0270341 | A1 * | 8/2022 | Kim ....................... G06V 10/26 |
| 2022/0291387 | A1 * | 9/2022 | Pacala ................... G01S 7/4817 |
| 2023/0058793 | A1 * | 2/2023 | Perazzi .................... G06N 3/08 |
| 2023/0076266 | A1 * | 3/2023 | Ying ...................... G06V 10/40 |
| 2023/0080693 | A1 * | 3/2023 | Hu ............................ G06T 5/70 382/275 |
| 2023/0099352 | A1 * | 3/2023 | Cantwell, Jr. ........... G06T 7/536 382/154 |

FOREIGN PATENT DOCUMENTS

| | | |
|---|---|---|
| CN | 111899169 A | 11/2020 |
| CN | 112262394 A | 1/2021 |
| TW | 201832179 A | 9/2018 |

* cited by examiner

METHOD AND DEVICE FOR DEEP GUIDED FILTER PROCESSING

CROSS-REFERENCE TO RELATED APPLICATIONS

This application is based on and claims priority under 35 U.S.C. § 119(e) to U.S. Provisional Patent Application No. 63/161,827, filed Mar. 16, 2021, to U.S. Provisional Patent Application No. 63/190,128, filed May 18, 2021, and to U.S. Provisional Patent Application No. 63/224,312, filed Jul. 21, 2021, the contents of which are incorporated herein by reference.

FIELD

The present disclosure relates generally to methods and devices for deep guided filter (DGF) image processing, and methods of training or optimizing the low complexity DGF.

BACKGROUND

Semantic segmentation is a process used in certain computer vision tasks, among other things. Neural network based semantic segmentation may use a dense prediction network that aims to classify pixels (e.g., each pixel) in an input image into a category (e.g., a set category or pre-defined category). For some tasks, such as applying smoothing filters to an image, content-aware image signal processing (ISP), or autonomous driving, achieving accuracy in such classification in the semantic boundary region may be important. However, achieving such accuracy may, in some processes, come at the expense of increased computational complexity, which may involve a burdensome amount of time and/or computing resources.

SUMMARY

According to some embodiments, a method of image processing includes: determining a first feature, wherein the first feature has a dimensionality D1; determining a second feature, wherein the second feature has a dimensionality D2 and is based on an output of a feature extraction network; generating a third feature by processing the first feature, the third feature having a dimensionality D3; generating a guidance by processing the second feature, the guidance having the dimensionality D3; generating a filter output by applying a deep guided filter (DGF) to the third feature using the guidance; generating a map based on the filter output; and outputting a processed image based on the map.

According to some embodiments, a system includes a processing circuit configured to implement a method of image processing. The method includes: determining a first feature, wherein the first feature has a dimensionality D1; determining a second feature, wherein the second feature has a dimensionality D2 and is based on an output of a feature extraction network; generating a third feature by processing the first feature, the third feature having a dimensionality D3; generating a guidance by processing the second feature, the guidance having the dimensionality D3; generating a filter output by applying a deep guided filter (DGF) to the third feature using the guidance; generating a map based on the filter output; and outputting a processed image based on the map.

BRIEF DESCRIPTION OF THE DRAWINGS

Certain aspects, features, and advantages of certain embodiments of the present disclosure will be readily apparent from the following detailed description and the accompanying drawings, in which.

DETAILED DESCRIPTION

Certain embodiments described herein provide for improved image smoothing via use of an improved DGF and semantic segmentation, and may include low complexity DGF and pixel-level prediction. This image processing may be part of a larger image processing method or pipeline, or may be used independently. In some embodiments, a smoothing filter that smooths an image is applied. It may be desirable, in some embodiments, to apply weaker or less smoothing to boundaries between different semantic areas of the image, relative to other areas of the image, to help maintain a sharp distinction between those semantic areas (e.g., boundaries between grass and sky in the image). Semantic segmentation may be used to help identify or define such boundaries, and smoothing may then be performed accordingly.

Certain comparative smoothing image processing techniques, such as those shown in FIG. 2 and described in detail below, involve inputting a "guidance" to a DGF. DGFs may include, for example, edge-preserving smoothing filters (smoothing filters that preserve sharp boundaries between semantic areas). The DGF may make use of a guidance that indicates, explicitly (e.g., via a "smoothing" weight or metric) or implicitly, how much smoothing should be applied. For example, guidance may indicate whether one or more pixels are part of a semantic boundary (or a likelihood that the one or more pixels are part of a semantic boundary), and smoothing may be applied accordingly (e.g., applied strongly to non-boundary pixels, and applied less strongly to boundary pixels). By way of another example, a guidance may indicate that a patch of an image is high variance or low variance, and smoothing may be applied accordingly (e.g., applied strongly to low variance patches, and applied less strongly to high variance patches).

According to certain example embodiments described herein, such as those shown in FIG. 3 and described in detail below, an improved DGF may make use of a lower resolution guidance (i.e., smaller in dimensionality and/or smaller in size (as used herein, "dimensionality" or "size" may refer to an amount of data or a number of data points (e.g., an image that has a height of three pixels and a width of three pixels has a dimensionality of 3×3, i.e. a dimensionality of nine))) than a guidance used in comparative techniques. This may result in a faster process and/or a process that uses less computing resources.

Figure 1:
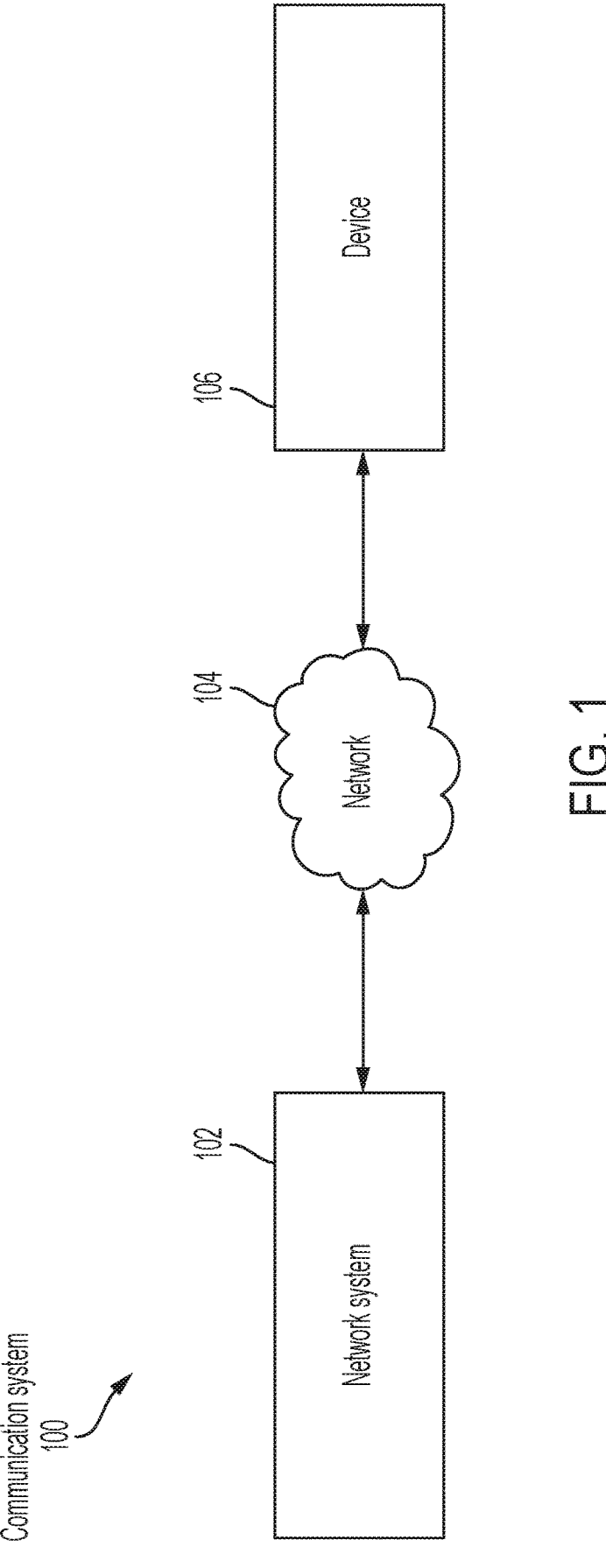
FIG. 1 illustrates an example embodiment of a communication system 100 configured for electronic communication.

FIG. 1 illustrates an example embodiment of a communication system 100 configured for electronic communication (e.g., cellular, Wi-Fi, satellite, or other electronic communication). The communication system 100 includes a network system 102, and network 104, and a device 106. The network system 102 may include one or more servers. The network 104 may include, for example, a cellular, Wi-Fi, satellite, or other network. The device 106 may include, for example, any device configured to communicate via the network 104 (e.g., a mobile device, a smartphone, a tablet, a desktop, a laptop, a local area network (LAN) device that serves local devices and that connects them the network 104 (such as a router), an internet of things (IoT) device, or any other appropriate communication device. The techniques described herein may be implemented by the communication system 100, or by one or more components thereof.

In some embodiments, the techniques described herein may be implemented by the network system 102 to process an image stored on the network system 102 (e.g., an image sent to the network system 102 by the device 106 via the network 104), and/or to train or optimize a DGF. In some embodiments, the optimized or trained DGF, or optimized parameters thereof, may be sent from the network system 102 to the device 106 via the network 104. In some embodiments, the techniques described herein may be implemented by the device 106 to process an image stored on the device 106, and/or to train or optimize a DGF stored on the device 106.

Though certain embodiments described herein may be described as being performed by the network system 102 or the device 106, it should be understood that the embodiments are not so-limited, and may be performed, for example, by either the network system 102, the device 106, or a combination thereof.

Figure 2:
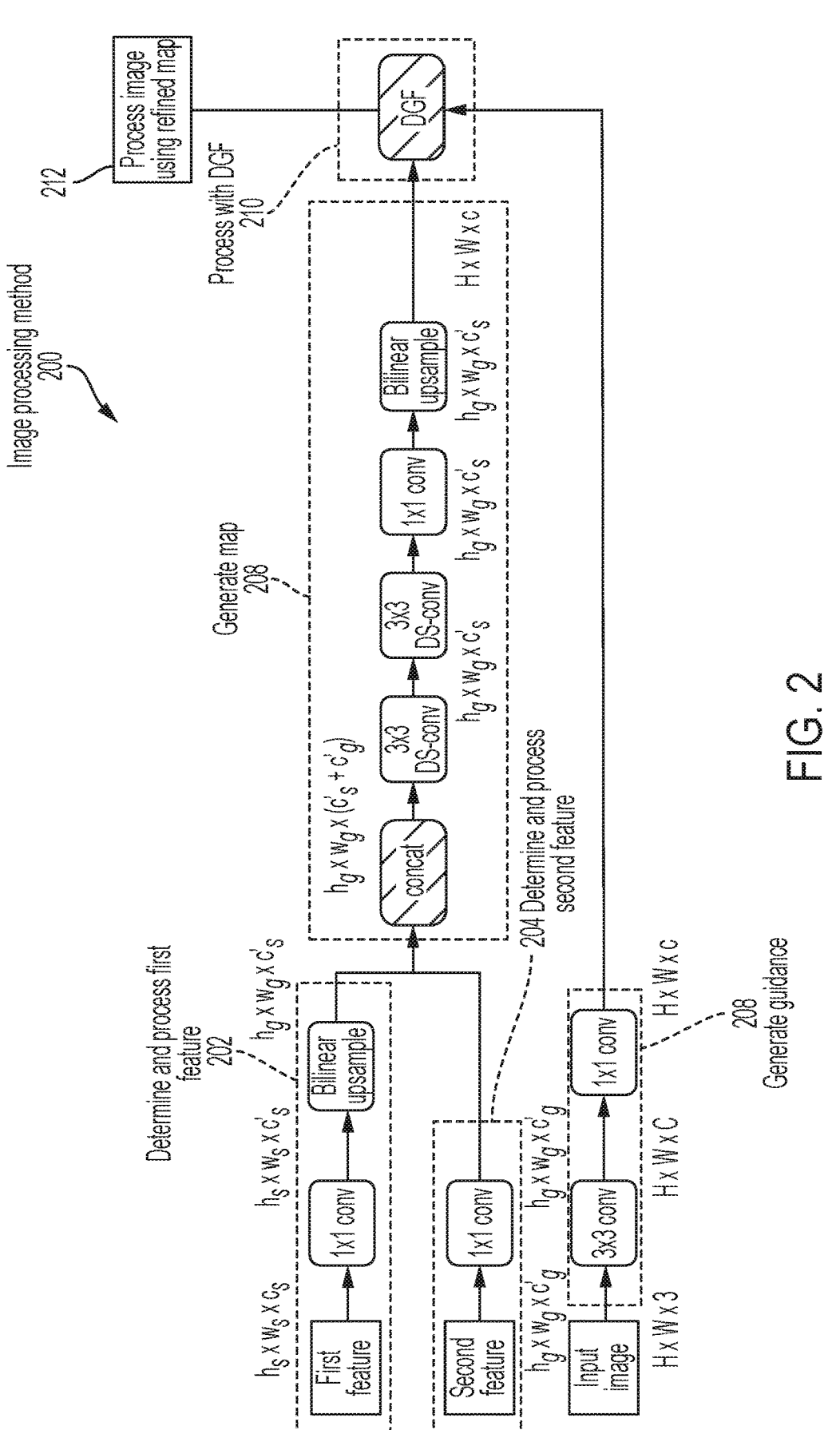
FIG. 2 illustrates a comparative example of an image processing method that uses a DGF.

FIG. 2 illustrates a comparative example of an image processing method 200 that uses a DGF. The image processing method 200 may be performed by the device 106. The image processing method 200 may include determining a map for an image smoothing process to be used on an input image. The image processing method 200 includes determining and processing a first feature (202), determining and processing a second feature (204), generating a map (206), generating a guidance (208), processing with a DGF (210), and processing the input image with a refined map (212). An output of the image processing method 200 can include a smoothed image. The refined map may indicate whether, or how much, smoothing is to be applied to one or more pixels of the input image. The refined map may indicate this on a pixel-by-pixel basis. Smoothing may be applied accordingly.

At (202), a first feature of an input image is determined and processed. The term "features," as used herein, can refer to one or more dimensional tensors. The input image may be, for example, encoded in any appropriate manner, and may have a dimensionality D4 equal to H×W×3, for example, where H is a height of the input image expressed as a number of rows of pixels, W is a width of the input image expressed as a number of columns of pixels, and 3 is a dimensionality of the color scheme of the input image (other dimensional color schemes may be used in other embodiments). Other dimensionalities for the input image may also be encompassed by the present disclosure. Though the above described example input image, and other images described herein, have two spatial dimensions, the images need not be images having only two spatial dimensions (e.g., the images may have three spatial dimensions including a height, and width, and a depth).

The first feature may be a semantic feature that encodes semantic information. Determining the first feature may include identifying, selecting, or generating a one or more dimensional tensor based on the input image that indicates, or is used to generate, a semantic label or semantic likelihood for each of a plurality of pixel patches of the input image (the patches may include contiguous pixels of the image, or may include non-contiguous pixels). The first feature may have a dimensionality D1 equal to $h_s \times w_s \times c_s$, where $h_s < H$ and $w_s < W$. The dimensionality D1 may be smaller than the dimensionality D4. The first feature may be an output of an Atrous Spatial Pyramid Pooling (ASPP) (e.g., a direct output, or a processed output) of a larger image processing method that includes the image processing method 200.

Processing the first feature can include applying a convolution to the first feature (e.g., applying a 1×1 convolution, such as a $$1 \times 1 \times c_s \times c_s'$$

kernel convolution) to change the dimensions of the first feature $$h_s \times w_s \times c_s \text{ to } h_s \times w_s \times c_s'$$

Processing the first feature can also include implementing bilinear upsampling to change the dimensions (e.g., resulting in a feature with dimensions $$h_g \times w_g \times c_s'$$

The resultant feature may be an input for the map generation process (206).

At (204), a second feature of the input image is determined and processed. Determining the second feature may include identifying, selecting, or generating a one or more dimensional tensor based on the input image that encodes boundary information. The second feature may include an output from a feature extraction network (FXN) (e.g., a direct output, or a processed output) of a larger image processing method that includes the image processing method 200. The second feature may have a dimensionality D2 equal to $h_g \times w_g \times c_g$. The dimensionality D2 may be smaller than both D1 and D4. In some embodiments, $H > h_g > h_s$ and $W > w_g > w_s$.

Processing the second feature can include applying a convolution to the second feature (e.g., applying a 1×1 convolution, such as a $$1 \times 1 \times c_g \times c_g'$$

kernel convolution) to change the dimensions of the second feature (e.g., from $$h_g \times w_g \times c_g \text{ to } h_g \times w_g \times c'_g \qquad 5$$

The resultant feature may be an input for the map generation process (206).

At (206), the device 106 generates a map for the input image. The map may be a preliminary or unrefined map that will later be refined by use of the DGF. Generating the map may include aggregating (e.g., concatenating) the processed first feature and the processed second feature (e.g., to generate a feature having dimensions $$h_g \times w_g \times \left(c'_s + c'_g\right)$$

Generating the map may include one or more (e.g., two subsequent) 3×3 depthwise separable (DS) convolutions, a 1×1 convolution, and/or bilinear upsampling to generate a preliminary map having dimensions H×W×c. The preliminary map generated at (206) may be input to the DGF at (210).

At (208), the device 106 generates a guidance for the DGF. The guidance is based on the input image. Generating the guidance may involve a 3×3 convolution and a 1×1 convolution, resulting in a guidance having dimensions H×W×c. Thus the dimensionality of the guidance may match the dimensionality of the preliminary map.

At (210), the device 106 inputs the preliminary map and the guidance to the DGF, and uses the DGF to determine a refined map. At (212), the device 106 uses the refined map to process the input image. The processing includes smoothing the input image using the refined map.

Figure 3:
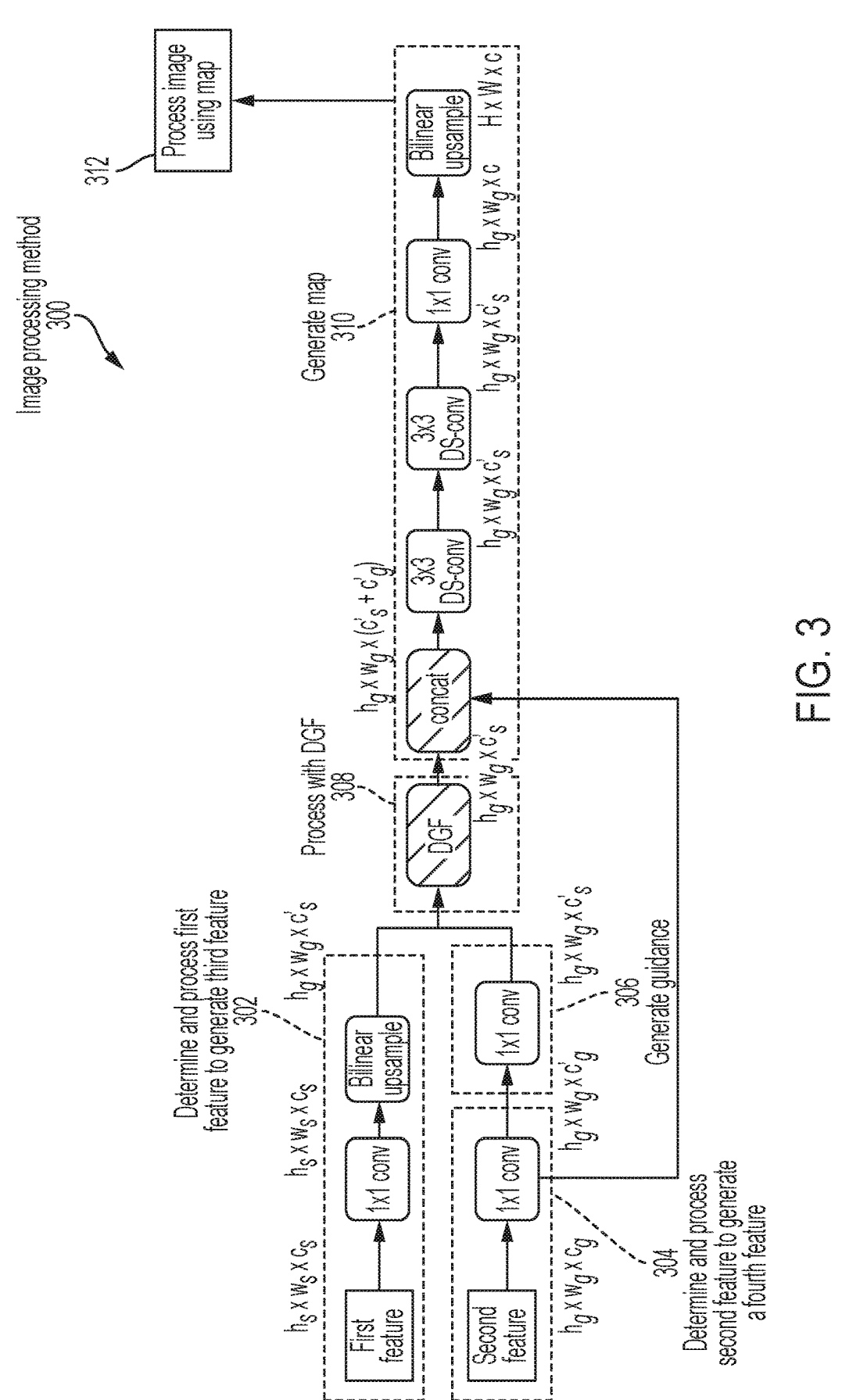
FIG. 3 illustrates an example embodiment of an image processing method that uses a DGF.

In this comparative example, the dimensionality of the guidance may be larger than a guidance used in certain example embodiments disclosed herein (e.g., as shown in FIG. 3), and thus the DGF processing that occurs at (210) may take longer and/or may involve more computing resources than for the DGF processing that occurs in the example embodiments disclosed herein.

Referring now to FIG. 3, FIG. 3 illustrates an example embodiment of an image processing method 300 that uses a DGF. The image processing method 300 uses a guidance having lower dimensionality than the guidance used in image processing method 200, and thus certain DGF processing used in the image processing method 300 may be completed faster and/or with less computing resources.

The image processing method 300 includes determining and processing a first feature to generate a third feature (302), determining and processing a second feature to generate a fourth feature (304), generating a guidance (306), processing with a DGF (308), generating a map (310), and processing an input image using the refined map (312).

At (302), a first feature of an input image is determined and processed to generate a third feature. The input image may be similar to the input image described herein in reference to FIG. 2, and may have a dimensionality D4. The first feature may have a dimensionality D1 that is smaller than D4. Processing the first feature can include applying a convolution to the first feature (e.g., applying a 1×1 convolution, such as a $$1 \times 1 \times c_s \times c'_s$$

kernel convolution) to change the dimensions of the first feature (e.g., from $$h_s \times w_s \times c_s \text{ to } h_s \times w_s \times c'_s$$

Processing the first feature can also include implementing bilinear upsampling to change the dimensions (e.g., resulting in a third feature with dimensions $$h_g \times w_g \times c'_s$$

The resultant third feature may be an input for processing with the DGF (308).

At (304), a second feature of the input image is determined and processed to generate a fourth feature. Determining the second feature may include identifying, selecting, or generating a one or more dimensional tensor based on the input image that indicates whether, or the likelihood that, each of a plurality of pixel patches of an image (the patches may include contiguous pixels of the image, or may include non-contiguous pixels) is part of a semantic boundary. The second feature may include an output from a feature extraction network (FXN) (e.g., a direct output, or a processed output) of a larger image processing method that includes the image processing method 300. The second feature may have a dimensionality D2 equal to $h_g \times w_g \times c_g$. The dimensionality D2 may be smaller than both D1 and D4. In some embodiments, $H > h_g > h_s$ and $W > w_g > w_s$.

Processing the second feature can include applying a convolution to the second feature (e.g., applying a 1×1 convolution, such as a $$1 \times 1 \times c_g \times c'_g$$

kernel convolution) to change the dimensions of the second feature (e.g., from $$h_g \times w_g \times c_g \text{ to } h_g \times w_g \times c'_g$$

The resultant fourth feature may be an input for generating the guidance (306), and may be an input for generating the map (310).

At (306), the device 106 generates a guidance based on the fourth feature. Generating the guidance can include applying a convolution to the fourth feature (e.g., applying a 1×1 convolution, such as a $$1 \times 1 \times c'_g \times c'_s$$

kernel convolution) to change the dimensions of the fourth feature (e.g., from $$h_g \times w_g \times c'_g \text{ to } h_g \times w_g \times c'_s).$$

The guidance may thus have dimensions of $$h_g \times w_g \times c'_s,$$

which may be a smaller dimensionality than the dimensions H×W×c of the guidance discussed herein in reference to FIG. 2. In the example embodiment shown in FIG. 3, the guidance many have the same dimensions as the third feature. The guidance may be an input to DGF processing at (308).

At (308), the device 106 uses a DGF to processes the third feature, using the guidance, to generate a filter output, which can serve as an input for the map generation process (310). The input for the map generation process may have the same dimensions as the third feature and as the guidance. The dimensions may be $$h_g \times w_g \times c'_s,$$

in the example depicted in FIG. 3. The DGF may be, for example, the DGF shown in FIG. 4, which is discussed in detail below. Because the guidance has smaller dimensionality than the guidance described herein in reference to FIG. 2, processing with the DGF (308) may be faster and/or may use less computational resources than the DGF processing (210).

At (310), the device 106 uses the output of the DGF and the fourth feature to generate a map. Generating the map may include aggregating (e.g., concatenating) the output of the DGF and the fourth feature (e.g., to generate a feature having dimensions $$h_g \times w_g \times (c'_s + c'_g)).$$

Generating the map may include one or more (e.g., two subsequent) 3×3 DS-convolutions, a 1×1 convolution, and/or bilinear upsampling to generate a map having dimensions H×W×c. At (312), the map may be used to process an image (e.g., the image may be smoothed based on the map).

Thus, the image processing method 300 may be an improvement over the image processing method 200 at least because the guidance used has smaller dimensionality than the guidance described herein in reference to FIG. 2, and so processing with the DGF (308) may be faster and/or may use less computational resources than the DGF processing (210).

Figure 4:
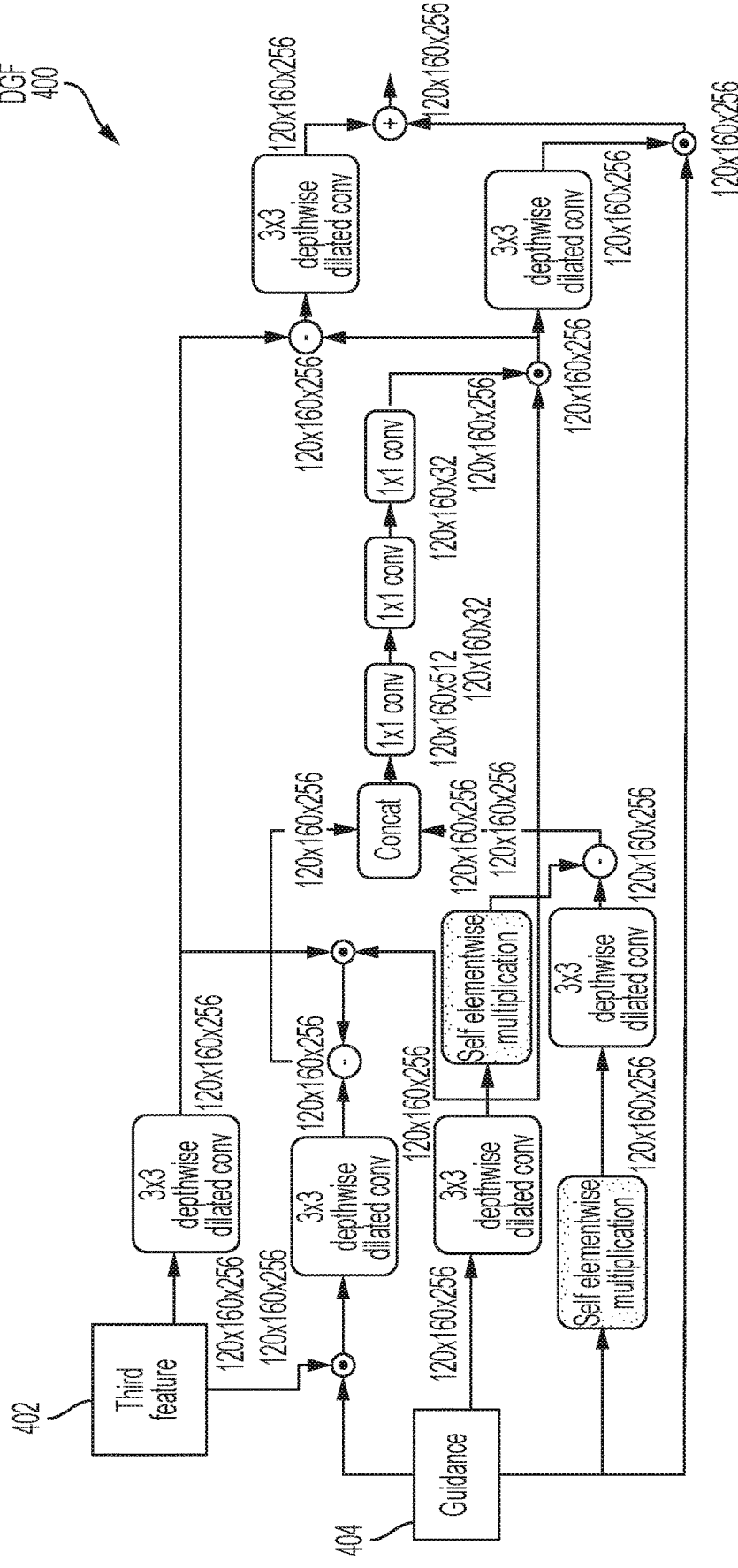
FIG. 4 illustrates an example embodiment of the DGF used in the image processing method shown in FIG. 3.

Referring now to FIG. 4, FIG. 4 illustrates an example embodiment of the DGF used in the image processing method shown in FIG. 3. The depicted DGF 400 receives, as an input, a third feature 402, such as the third feature that was generated by processing the first feature at (302) in FIG.

3. The DGF 400 also receives, as an input, a guidance 404, such as the guidance generated at (306) in FIG. 3. The guidance 404 may have dimensions of $$h_g \times w_g \times c'_s,$$

which may be smaller than the dimensions of the guidance generated at (208) in FIG. 2. In the example depicted in FIG. 4, the input image on which the first and second features are based has dimensions of H=480 and W=640, and the guidance 404 has dimensions of 120×160×256 corresponding to $$h_g \times w_g \times c'_s,$$

but other dimensions can be used in other implementations. The guidance 404 has smaller dimensions than the input image being processed. The third feature 402 and the guidance 404 may have the same dimensions.

The DGF 400 includes, or is defined by, a flow of operations that uses the input third feature 402 and the input guidance 404. One or more of these operations may be implemented as one or more layers in a network. The flow of operations may include one or more of 3×3 depthwise dilated convolutions, 1×1 convolutions, aggregations (e.g., concatenations), self elementwise multiplications, dot products, subtractions, additions, or other appropriate operations, as shown in FIG. 4 using symbols well known to those having ordinary skill in the relevant art. Each operation is performed such that it generates a feature having the same dimensions as the third feature 402 and the guidance 404 (in the depicted example, 120×160×256). By ensuring that the guidance 404 has relatively small dimensions (e.g., via the processing shown in FIG. 3), the flow of operations that defines the DGF 400 can be performed faster and/or with fewer computing resources than with a guidance having relatively larger dimensions.

Table 1 below shows some example code that corresponds to the flow of operations that defines the DGF 400 (right column), and some comparative example code that corresponds to the flow of operations for the comparative DGF used at (210) in FIG. 2. The code that corresponds to the DGF 400 can be executed faster and/or with less computing resources than the comparative code, at least because the code that corresponds to the DGF 400 uses a guidance having a smaller dimensionality than the guidance used by the comparative code.

TABLE 1

| Comparative DGF | DGF 400 |
|---|---|
| Third feature: f | Third feature: f |
| Guidance: g | Guidance: g |
| Output: q | Output: q |
| Steps: | Steps: |
| (1) | (1) |
| $m_f$ = boxFilter(f) | $m_f$ = depthwiseDilatedConv(f) |
| $m_g$ = boxFilter(g) | $m_g$ = depthwiseDilatedConv(g) |
| $\text{corr}_g$ = boxFilter(g.* g) | $\text{corr}_g$ = depthwiseDilatedConv(g.* g) |
| $\text{corr}_{gf}$ = boxFilter(g.* f) | $\text{corr}_{gf}$ = depthwiseDilatedConv(g.* f) |
| (2) | (2) |
| $\text{var}_g = \text{corr}_g - m_g.* m_g$ | $\text{var}_g = \text{corr}_g - m_g.* m_g$ |
| $\text{cov}_{gf} = \text{corr}_{gf} - m_g.* m_f$ | $\text{cov}_{gf} = \text{corr}_{gf} - m_g.* m_f$ |
| (3) | (3) |

9

TABLE 1-continued

| $a = cov_{gf}/(var_g + \epsilon)$ | $c = concate([cov_{gf}, var_g])$ |
|---|---|
| $b = m_f - a.* m_g$ | $a = pointwiseConvBlock(c)$ |
| (4) | $b = m_f - a.* m_g$ |
| $m_a = boxFilter(a)$ | (4) |
| $m_b = boxFilter(b)$ | $m_a = depthwiseDilatedConv(a)$ |
| (5) | $m_b = depthwiseDilatedConv(b)$ |
| $q = m_a.* g + m_b$ | (5) |
| | $q = m_a.* g + m_b$ |

Figure 5:
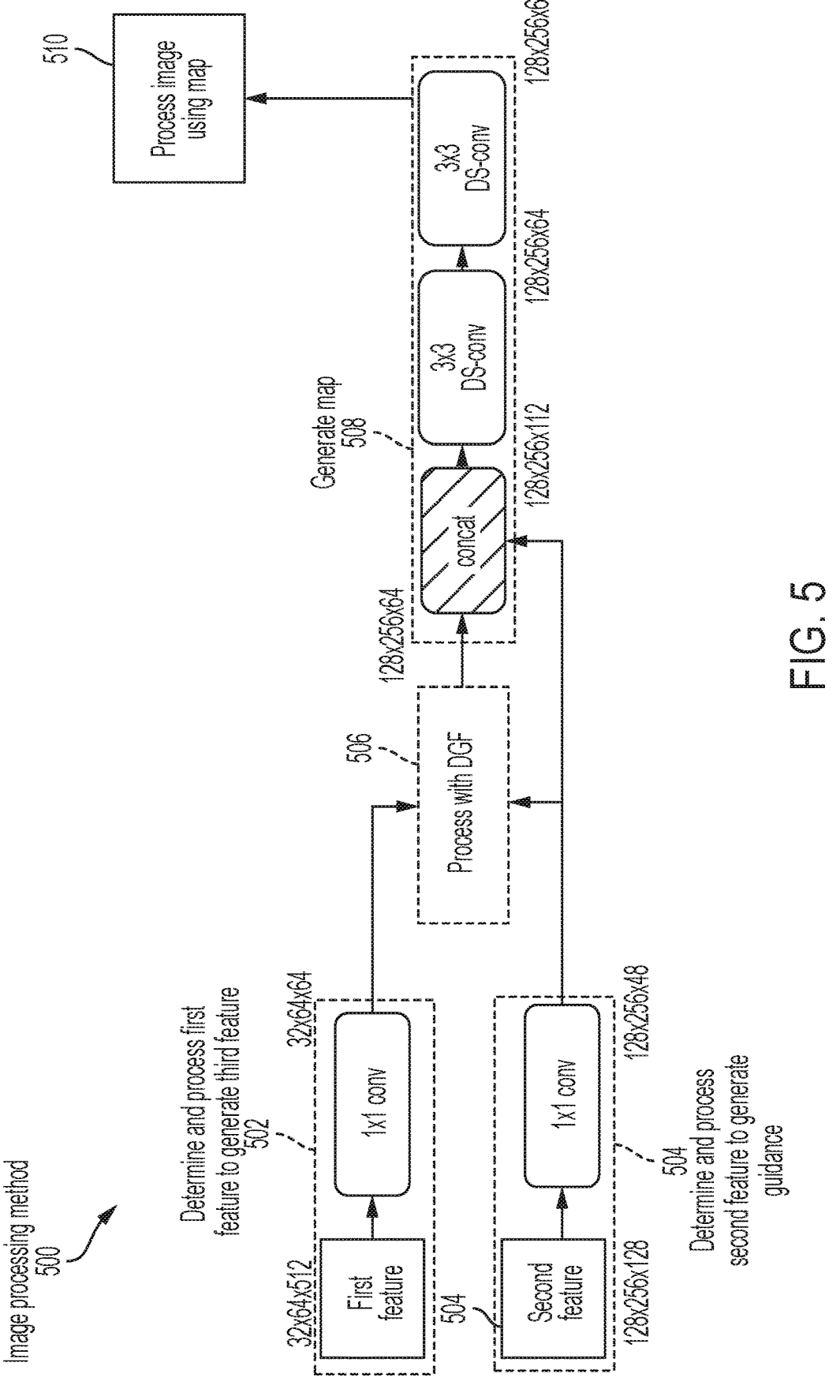
FIG. 5 illustrates another example embodiment of an image processing method that uses a DGF.

Referring now to FIG. 5, FIG. 5 illustrates an example embodiment of an image processing method 500 that uses a DGF. The image processing method 500 uses a guidance having a lower dimensionality than the guidance used in image processing method 200. In some embodiments, in the image processing method 500, a third feature that is input to the DGF for processing has a dimensionality different than (e.g., lower than) a dimensionality of a guidance that is also input to the DGF. In some embodiments, within the DGF, the guidance may be downsampled (reduced in dimensionality), and one or more DGF operations may be performed at the lower dimensionality, thus improving processing time and/ or number of computing resources used. The guidance may also be an input to a map generating process (e.g., may be aggregated (e.g., concatenated) to an output of the DGF) without such downsampling. The image processing method 500 may be implemented, for example, using DGF embodiments shown in FIG. 6 or FIG. 7. For at least these reasons, certain DGF processing used in the image processing method 500 may be completed faster and/or with less computing resources.

The image processing method 500 can be performed by the device 106, and includes determining and processing a first feature to generate a third feature (502), determining and processing a second feature to generate a guidance (504), processing with a DGF (506), generating a map (508), and processing an input image using the map (510). The first feature may have a dimensionality D1, the second feature may have a dimensionality D2, the third feature may have a dimensionality D3, the guidance may have a dimensionality D4, and an input image on which the first feature and second feature are based may have a dimensionality D5. In the image processing method 500, D3<D4.

At (502), the device 106 may determine the first feature using a process similar to the process described above in reference to (302) (e.g., the first feature may be based on an output from an ASPP module). The first feature may have a dimensionality D1. In the depicted example, D1=32×64× 512, but other dimensions can be implemented in other embodiments.

Processing the first feature to generate the third feature at (502) may also be performed similarly to the process described above in reference to (302), but it is noted that here, the third feature is generated such that it has a dimensionality D3 that is lower than a dimensionality D2 of the guidance. For example, a 1×1 convolution is performed to tune (e.g., reduce) the dimensionality of the first feature, thus generating the third feature. In the depicted example, D3=32×64×64, and the 1×1 convolution may include a 1×1×512×64 kernel convolution, but in other embodiments other dimensions and other 1×1 convolutions may be implemented.

At (504), the device 106 may determine the second feature using a process similar to the process described above in reference to (304) (e.g., the second feature may be based on an output from a FXN). The second feature may have a dimensionality D2. In the depicted example, D2=128×256×128, but other dimensions can be implemented in other embodiments.

Processing the second feature to generate the guidance at (504) may also be performed similarly to the process described above in reference to (304). For example, a 1×1 convolution is performed to tune (e.g., reduce) the dimensionality of the second feature, thus generating the guidance having a dimensionality of D4. In the depicted example, D4=128×256×48, and the 1×1 convolution may include 1×1×128×48 kernel convolution, but in other embodiments other dimensions and other 1×1 convolution may be implemented. The dimensionality D4 of the guidance is higher than the dimensionality D3 of the third feature.

At (506), the device 106 may use the DGF to process the third feature with the help of the guidance, to generate a filter output. In some embodiments, the DGF may be a dual resolution DGF and may include, for example, the DGF 600 described below in reference to FIG. 6. In some embodiments, the DGF may be a single resolution DGF and may include, for example, the DGF 700 described below in reference to FIG. 7. The DGF may output a feature to be used in a map generating process at (508). In the depicted example, the third feature has dimensions of 32×64×64, the guidance has dimensions of 128×256×48, and the output of the DGF has dimensions of 128×256×64, but in other embodiments different dimensions may be implemented.

At (508), the device 106 uses the output of the DGF and the guidance to generate a map. Generating the map may include aggregating (e.g., concatenating) the output of the DGF and the guidance. Generating the map may include one or more (e.g., two subsequent) 3×3 DS-convolutions. At (510), the map may be used to process the input image (e.g., the input image may be smoothed based on the map).

Thus, the image processing method 500 may be an improvement over the image processing method 200 at least because processing with the DGF at (506) may be faster and/or may use less computational resources than the DGF processing (210).

Figure 6:
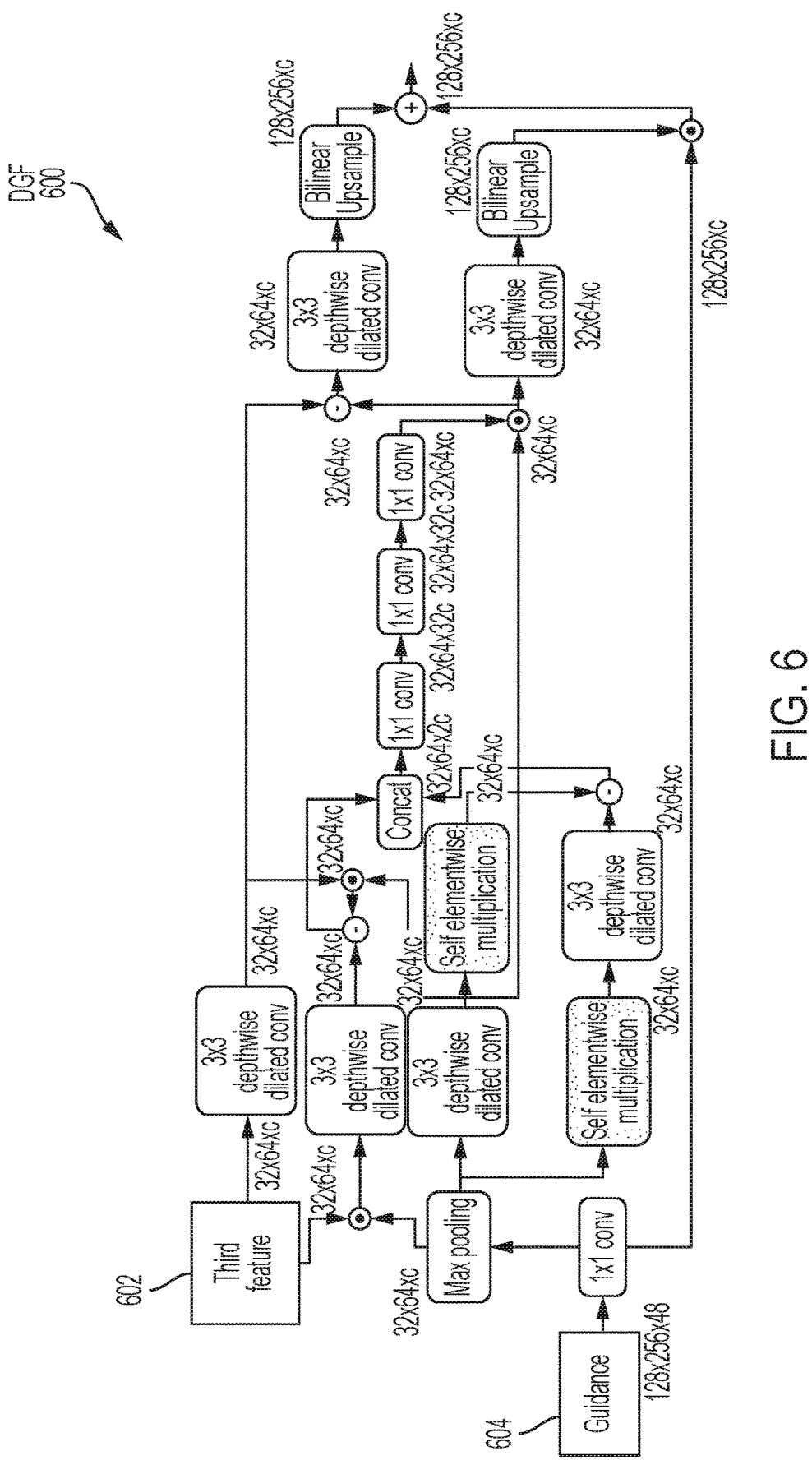
FIG. 6 illustrates an example embodiment of a dual-resolution DGF.

Referring now to FIG. 6, FIG. 6 illustrates an example embodiment of a dual resolution DGF used in the image processing method shown in FIG. 5. The depicted DGF 600 receives, as an input, a third feature 602, such as the third feature that was generated by processing the first feature at (502) in FIG. 5. The DGF 600 also receives, as an input, a guidance 604, such as the guidance generated at (504) in FIG. 5. The guidance 604 may have dimensions smaller than the dimensions of the guidance generated at (208) in FIG. 2. The guidance 604 has a dimensionality D4 that is larger than a dimensionality D3 of the third feature. In the example depicted in FIG. 6, the third feature 602 has dimensions of 32×64×c, and the guidance 604 has dimensions of 128× 256×48, but other dimensions can be used in other implementations.

The DGF 600 includes, or is defined by, a flow of operations that processes the third feature 602 using the guidance 604. One or more of these operations may be implemented as one or more layers in a network. The flow of operations may include one or more of max pooling, bilinear upsampling, 3×3 depthwise dilated convolutions, 1×1 convolutions, aggregations (e.g., concatenations), self elementwise multiplications, dot products, subtractions, additions, or other appropriate operations, as shown in FIG. 6 using symbols well known to those having ordinary skill in the relevant art.

The flow of operations includes downsampling (lowering the dimensionality of) the guidance 604 to match the dimensionality D3 of the third feature (e.g., via a process that includes max pooling), and performing a plurality of operations at the lowered dimensionality D3. The flow of operations may include one or more upsampling processes (processes that raise dimensionality, such as a bilinear upsampling process) after the plurality of operations at the lowered dimensionality D3 (e.g., at or near an end of the flow of operations), further processing the upsampled features (e.g., via dot product or aggregation operations) after the one or more upsampling processes, and outputting a feature that has higher dimensionality than D3.

The further processing of the upsampled features includes performing a dot product operation on a higher resolution version of the guidance (e.g., a higher resolution version of the guidance generated by 1×1 convolution of the guidance 604) that has a dimensionality equal to the output of the DGF 600.

Thus, by generating and using a third feature 602 and a guidance 604 that have relatively small dimensions (e.g., via the processing shown in FIG. 5), the flow of operations that defines the DGF 600 can be performed faster and/or with fewer computing resources than with a guidance having relatively larger dimensions.

Figure 7:
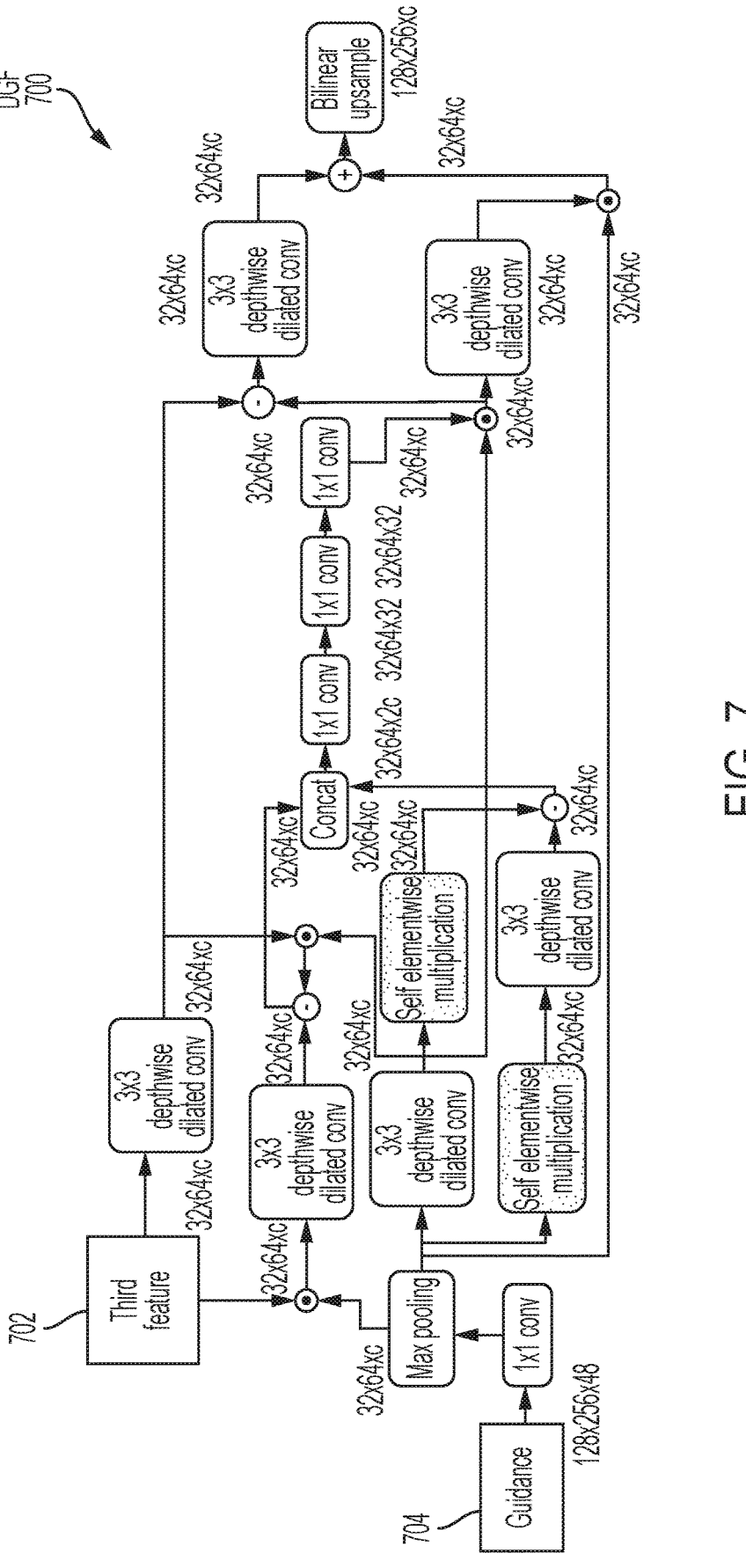
FIG. 7 illustrates an example embodiment of a single resolution DGF.

Referring now to FIG. 7, FIG. 7 illustrates an example embodiment of a "single resolution" or "single dimensional" DGF that may be used in the image processing method shown in FIG. 3 or in FIG. 5. The depicted DGF 700 receives, as an input, a third feature 702, such as the third feature that was generated by processing the first feature at (502) in FIG. 5. The DGF 700 also receives, as an input, a guidance 704, such as the guidance generated at (504) in FIG. 5. The guidance 704 may have dimensions smaller than the dimensions of the guidance generated at (208) in FIG. 2. The guidance 704 has a dimensionality D4 that is larger than a dimensionality D3 of the third feature. In the example depicted in FIG. 7, the third feature 704 has dimensions of 32×64×c, and the guidance 704 has dimensions of 128× 256×48, but other dimensions can be used in other implementations.

The DGF 700 includes, or is defined by, a flow of operations that processes the third feature 702 using the guidance 704. One or more of these operations may be implemented as one or more layers in a network. The flow of operations may include one or more of max pooling, bilinear upsampling, 3×3 depthwise dilated convolutions, 1×1 convolutions, aggregations (e.g., concatenations), self elementwise multiplications, dot products, subtractions, additions, or other appropriate operations, as shown in FIG. 7 using symbols well known to those having ordinary skill in the relevant art.

The flow of operations includes downsampling (lowering the dimensionality of) the guidance 704 to match the dimensionality D3 of the third feature (e.g., via a process that includes max pooling), and performing a plurality of operations at the lowered dimensionality D3. The flow of operations may include further processing the upsampled features (e.g., via dot product or aggregation operations) after the one or more upsampling processes, and outputting a feature that has higher dimensionality than D3. The further processing of the upsampled features includes performing a dot product operation on a lower resolution version of the guidance (e.g., a lower resolution version of the guidance generated by the process that includes max pooling) that has a dimensionality smaller than the output of the DGF 700.

The flow of operations may include a final upsampling process (a process that raises dimensionality, such as a bilinear upsampling process) after the plurality of operations at the lowered dimensionality D3 (e.g., at or near an end of the flow of operations), and the result of the upsampling process may be the output from the DGF 700.

Thus, by generating and using a third feature 700 and a guidance 704 that have relatively small dimensions (e.g., via the processing shown in FIG. 5), the flow of operations that defines the DGF 700 can be performed faster and/or with fewer computing resources than with a guidance having relatively larger dimensions.

Figure 8:
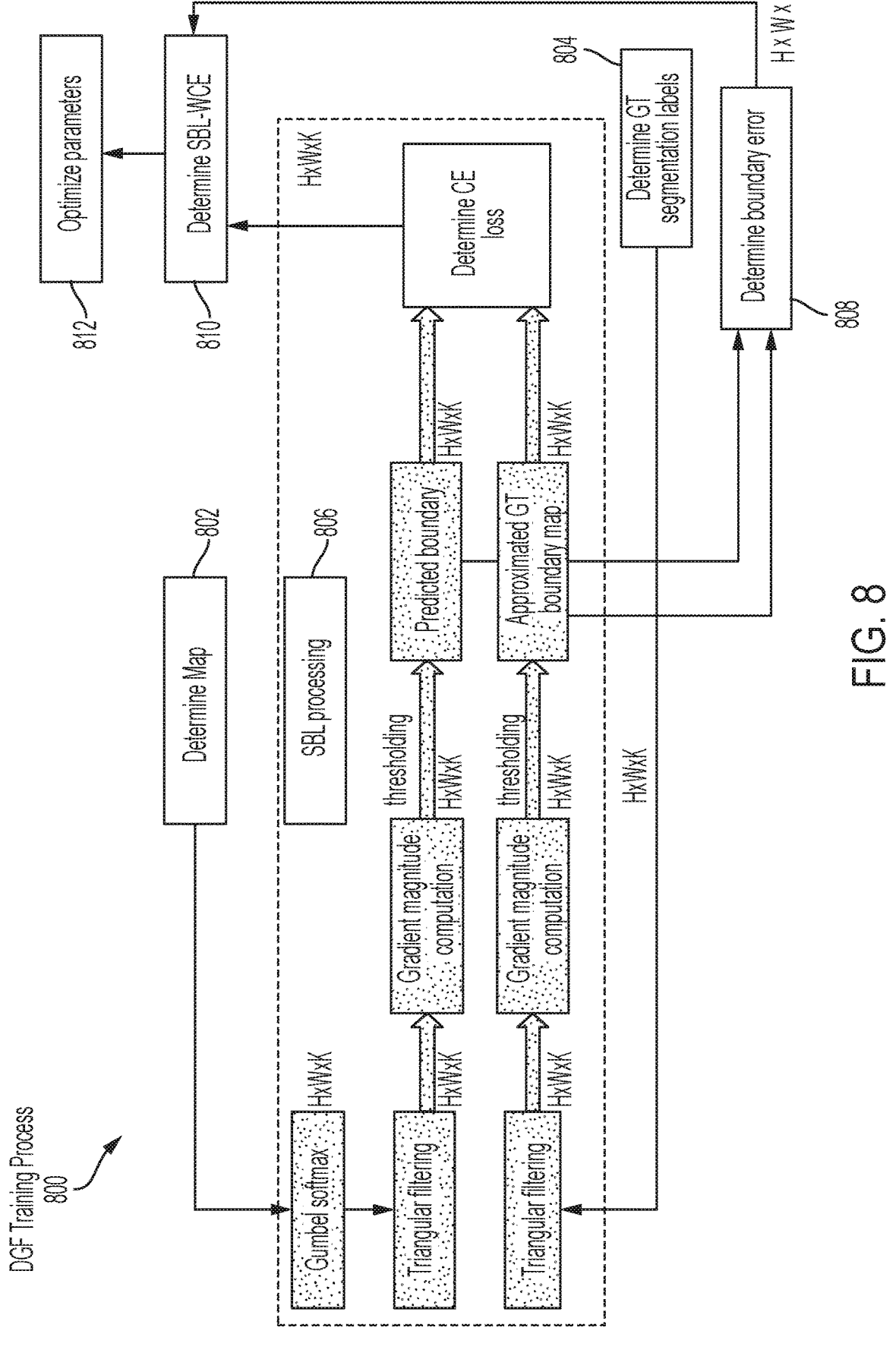
FIG. 8 illustrates an example embodiment of a DGF training process.

FIG. 8 illustrates an example embodiment of a DGF training process 800. Though the following describes the network system 102 as implementing the DGF training process 800 by way of example, the DGF training process may be performed by the device 106 or by the network system 102, or a combination thereof, in other embodiments. The DGF training process 800 can be used to optimize or improve parameters used in a DGF (e.g., the DGF 400, the DGF 600, or the DGF 700 described herein). The DGF training process 800 can also be used to optimize or improve other parameters used in the image processing method 300 (e.g., parameters used at (302), (304), and/or (306)) or the image processing method 500 (e.g., parameters used at (502) and/or (504)). The parameters that are optimized or improved can include, for example, coefficients used in networks (e.g., networks used to implement convolutions, or batch normalization layers used in certain processes).

One comparative approach to training includes using softmax cross entropy for semantic segmentation training, which can be used to determine pixel-level task loss. That loss can be used in, or as, a loss function for training. The presently described DGF training process 800 uses semantic boundary learning (SBL) as a multitask loss as well as pixel-level task loss (e.g., softmax cross entropy), which can improve the training capability (e.g., capability for learning fine-grain image structures). The DGF training process 800 includes determining a map (802), determining ground truth (GT) segmentation labels (804), SBL processing (806), determining SBL-weighted cross entropy (SBL-WCE) (810), and optimizing parameters (812).

At (802), the network system 102 determines a map that can be used to process (e.g., smooth) an input image. The map may be determined using processes of the image processing method 300 (e.g., at (310)) or of the image processing method 500 (e.g., at (508)), for example. The map may be an input for SBL processing at (806).

At (804), the network system 102 determines GT segmentation labels, which may be used as an input to the SBL processing at (806). The GT segmentation labels may be used in the SBL processing at (806) to predict a semantic boundary as a tensor of shape (H, W, C), where H and W denote the height and width, and C denotes the number of classes.

At (806), the network system 102 performs SBL processing, using the map determined at (802) and the GT segmentation labels determined at (804). SBL can include using an augmented deep network with a semantic boundary detection branch, and training the network using a determined SBL. The SBL processing includes determining a CE loss computed between (e.g., as the difference of) a GT semantic boundary (e.g., an approximated GT boundary map which is determined based on the GT segmentation labels determined at (804)), and a predicted boundary (e.g., a semantic boundary derived from a predicted semantic segmentation map).

The SBL processing 806 can include a plurality of processes performed on an input map having dimensions H×W×K (where K is a number of classes that the process aims to classify), including one or more Gumbel Softmax processes, one or more triangular filtering processes, one or more gradient magnitude computations, one or more thresholding processes, determining the predicted boundary, determining an approximated GT boundary map, and determining cross entropy (CE) loss (e.g., Softmax CE loss). One or more of these processes may be implemented as one or more layers in a network.

The Gumbel Softmax processes may be implemented as a Gumbel Softmax layer. In some embodiments, the Gumbel Softmax layer is a differentiable surrogate of an Argmax(•) function. Let $$\pi_k^{i,j}$$

denote the value of pixel (i,j) in the k-th channel of the soft logits volume and $$y_k^{i,j}$$

denote the logits and $$S(y_k^{i,j})$$

denote the output of the Gumbel Softmax layer at pixel (i, j):

$$S(y_k^{i,j}) = \frac{\exp\left(\left(\pi_k^{i,j} + g_k^{i,j}\right)/\tau\right)}{\sum_{k=0}^{K} \exp\left(\left(\pi_k^{i,j} + g_k^{i,j}\right)/\tau\right)}, k = 0, 1, 2, \ldots, K, \quad \text{(Equation 1)}$$

where $$g_k^{i,j}$$

is random noise sampled from a Gumbel distribution and $\tau=0.5$ is the temperature of the Softmax function and K is the number of classes. The Gumbel distribution may be defined as:

$$g_k^{i,j} = -\log(\epsilon - \log(U + \epsilon)) \text{ and } U \sim \text{Uniform}(0, 1), \quad \text{(Equation 2)}$$

where $\epsilon = 1\text{e-}10$ is a small number for numerical stability and U is a random variable having uniform distribution in interval [0, 1].

In some embodiments, the triangular filtering processes may be implemented as a separable triangular filter layer. Separable triangle filtering can be used as preprocessing for edge detection tasks. Separable triangle filtering smooths the image and suppresses noise near to the edges. The kernel may be computed based on the bandwidth (e.g., a kernel for bandwidth n (an odd number) may be $$\left[\frac{1}{s}, \frac{2}{s}, \ldots, \frac{\frac{n}{2}+1}{s}, \ldots, \frac{2}{s}, \frac{1}{s}\right], \quad s = \sum_{i=1}^{n} i).$$

This kernel may be applied to horizontal and vertical directions sequentially for each class in the output of the Gumbel Softmax layer. This layer need not have learnable parameters. In some embodiments, the bandwidth n=9.

In some embodiments, the gradient magnitude computation may be computed in a manner similar, in certain regards, to the triangle filter layer. A kernel f=[−0.5, 0, 0.5] may be used as the 1-D kernel. This kernel is used to convolve with each channel of the input tensor. For computing the gradient in a horizontal direction, kernel f may be used, and to compute the gradient in the vertical direction, $f^T$ may be used. The magnitude may be computed as the L2 norm of the gradients from the two directions. Note that in some embodiments, the gradient magnitude can be computed using a 2D filter with 2D kernel.

In some embodiments, thresholding processes may include setting all pixels having values smaller than a threshold to a preset value (e.g., to zero). The so-processed map may be used to predict a boundary.

In some embodiments, an approximated GT boundary map may be determined using image warping via optical flow. For example, the GT boundary can be one warped from a GT boundary from another similar image (e.g., neighboring frames in videos).

One input used to determine the CE loss is a per class gradient magnitude map $\xi$ determined based on the predicted boundary, and a per class gradient magnitude map $\hat{\xi}$ determined based on from the approximated GT boundary map.

In some embodiments, the per class gradient magnitude map can be used as a semantic boundary label and computed in a computational graph during training. The loss may be a L1 norm loss computed between $\hat{\xi}$ and $\xi$. Let $S(y^k)$ denote the class k in the output of the Gumbel Softmax $S(•)$ operator, $y^k$ denote the logits of class k, and G represent triangle filtering, and $\nabla$ is the gradient operator. Let $\xi_k$ represent the gradient map of the predicted segmentation map of class k, and $$B_\xi^+$$

denotes the positive (predicted boundary) pixels in $\xi$, and $$B_{\hat{\xi}}^+$$

denotes the positive (boundary) pixels in $\hat{\xi}$. The loss L may computed as follows:

$$L_{SBL} = \sum_{B^+ \in \xi \cup B^+ \in \hat{\xi}} \left| \xi(B^+) - \hat{\xi}(B^+) \right| = \quad \text{(Equation 3)}$$

$$\frac{0.5 * \Sigma_{B_\xi^+} \left| \xi(B_\xi^+) - \hat{\xi}(B_\xi^+) \right|}{\left| B_\xi^+ \right|} + \frac{0.5 * \Sigma_{B_{\hat{\xi}}^+} \left| \xi(B_{\hat{\xi}}^+) - \hat{\xi}(B_{\hat{\xi}}^+) \right|}{\left| B_{\hat{\xi}}^+ \right|}$$

$$\xi_k = \frac{1}{\sqrt{2}} \left\| \nabla(G * S(y^k)) \right\| \quad \text{(Equation 4)}$$

US 12,620,059 B2

15

In some embodiments, $\xi$ and $\hat{\xi}$ have a shape (H, W, K). To obtain the pixel set $$B_\xi^+ \text{ and } B_{\hat{\xi}}^+,$$

a threshold T=0.1 may be applied to $\xi$ and $\hat{\xi}$ to obtain spatial binary masks $M_\xi$ and $M_{\hat{\xi}}$. The masks may be used to mask the following loss via elementwise multiplication ($\odot$):

$$L_{SBL} = 0.5 * L_1 + 0.5 * L_2, \quad \text{(Equation 5)}$$

$$L_1 = \frac{\sum_c \sum_j \sum_i M_{\xi_{i,j,c}} \odot |\xi_{i,j,c} - \hat{\xi}_{i,j,c}|}{\sum_c \sum_j \sum_i M_{\xi_{i,j,c}}}, \quad \text{(Equation 6)}$$

$$L_2 = \frac{\sum_c \sum_j \sum_i M_{\hat{\xi}_{i,j,c}} \odot |\xi_{i,j,c} - \hat{\xi}_{i,j,c}|}{\sum_c \sum_j \sum_i M_{\hat{\xi}_{i,j,c}}}, \quad \text{(Equation 7)}$$

where $i \in \{0,1,2, \ldots, H-1\}$; $j \in \{0,1,2, \ldots, W-1\}$; $c \in \{0,1, 2, \ldots, C-1\}$.

In some embodiments, there need not be any learnable parameters in the triangle filter layers and gradient magnitude computation layers.

At (808), the network system 102 determines boundary error based on the predicted boundaries and the approximated GT boundary map determined at (806). The boundary error may be an input for determining SBL-WCE at (810). The boundary error may be determined as the discrepancy between the predicted boundary and the approximated GT boundary map, and can be used as a weight for a weighted cross entropy (WCE) (e.g., a Softmax cross entropy) loss to further enhance prediction accuracy in boundary regions at (810). The boundary error may be expressed as a tensor having dimensions H×W×1.

In some embodiments, the boundary error is determined as a spatial weight mask. The spatial weight mask may be applied to determined Softmax cross entropy loss to further improve the prediction accuracy in the boundary regions. The spatial weight mask may be a pixel-wise error map. Each pixel may have a different value depending on whether the pixel in the predicted boundary map has the same (or similar) value as the corresponding pixel in the approximated GT boundary map. The following equation shows an example of how the pixel-wise boundary error mask is applied to Softmax cross entropy, where $w_{i,j}$ denotes the weight at pixel (i,j), $t_{i,j,c}$ denotes the ground truth label at location (i,j), and $y_{i,j,c}$ is the Softmax output of the semantic prediction:

$$L_{SBL-WCE} = -\sum_j^{H-1} \sum_i^{W-1} w_{i,j} \sum_{c=0}^{C} t_{i,j,c} \log y_{i,j,c}$$

$$w_i = 0.5 * R_c\left(M_{\xi_{i,j,c}}\right) \odot |R_c(\xi_{i,j,c}) - R_c(\hat{\xi}_{i,j,c})| +$$

$$0.5 * R_c\left(M_{\hat{\xi}_{i,j,c}}\right) \odot |R_c(\xi_{i,j,c}) - R_c(\hat{\xi}_{i,j,c})|,$$

$M_\xi$ spatial mask obtained by thresholding $\xi$
$M_{\hat{\xi}}$ spatial mask obtained by thresholding $\hat{\xi}$
Where $R_c(\bullet)$ denotes logic OR operation along channel dimension. So, the total loss is: $L = \lambda_1 L_{SBL-WCE} + \lambda_2 L_{SBL}$, where $\lambda_1$ and $\lambda_2$ are the weights for balancing the two loss terms.

At (810), the network system 102 determines the SBL-WCE based on the CE loss determined via the SBL processing at (806), and the boundary error determined at (808). The SBL-WCE may serve as a loss for a loss function, or as the loss function itself, for training an optimization at (812). In determining the SBL-WCE, the boundary error determined at (808) may be used as a weight for the CE loss determined at (806).

At (812), the network system 102 may use the SBL-WCE as a loss for a loss function, or as the loss function itself, to optimize or improve the parameters of the image processing method being trained. Thus, the DGF training process 800 uses SBL as a multitask loss as well as pixel-level task loss (e.g., softmax cross entropy), which can improve the training capability (e.g., capability for learning fine-grain image structures) and which can result in an improved image processing method.

Figure 9:
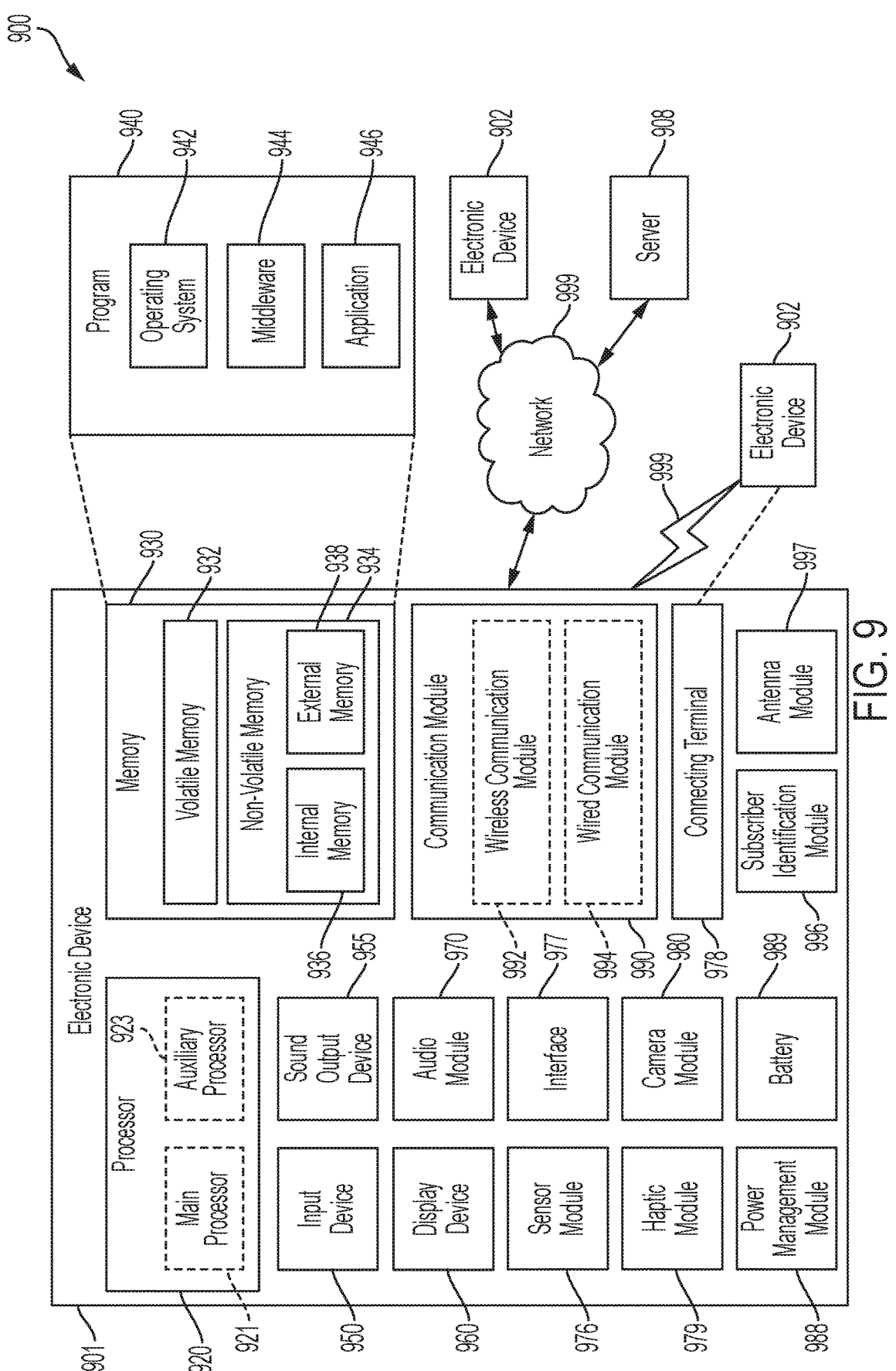
FIG. 9 illustrates an example embodiment of a system configured to manage image processing that uses a DGF.

FIG. 9 shows an example of a system 900 configured to implement image processing, according to some embodiments. Referring to FIG. 9, the electronic device 901 (which may be similar to, or the same as, the device 106) in the system 900 may communicate with an electronic device 902 via a first network 998 (e.g., a short-range communication network, such as a Wi-Fi network or local area network), or an electronic device 904 or a server 908 (which may be similar to, or the same as, the network system 102) via a second network 999 (which may be similar to, or the same as, the network 104), such as a long-range wireless communication network (e.g., a cellular communication network, such as a 5G network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, and/or an antenna module 997. In one embodiment, at least one of the components (e.g., the display device 960 or the camera module 980) may be omitted from the electronic device 901, or one or more other components may be added to the electronic device 901. In one embodiment, some of the components may be implemented as a single integrated circuit (IC). For example, the sensor module 976 (e.g., a fingerprint sensor, an iris sensor, or an illuminance sensor) may be embedded in the display device 960 (e.g., a display), or the display device 960 may include one or more sensors in addition to the sensor module 976.

In some embodiments, the electronic device 901 may include a computing device or processor configured to implement image processing, such as the methods of image processing described herein.

The processor 920 may execute, for example, software (e.g., a program 940) to control at least one other component (e.g., a hardware or a software component) of the electronic device 901 coupled with the processor 920, and may perform various data processing and/or computations. As at least a part of the data processing and/or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, and/or execute a particular function. The auxiliary processor 923 may be implemented as being separate from, or as a part of, the main processor 921.

The auxiliary processor 923 may control at least some of the functions or states related to at least one component (e.g., the display device 960, the sensor module 976, or the communication module 990) from among the components of the electronic device 901, instead of the main processor 921 while the main processor 921 is in an inactive (e.g., sleep) state, or together with the main processor 921 while the main processor 921 is in an active state (e.g., executing an application). According to one embodiment, the auxiliary processor 923 (e.g., an image signal processor or a communication processor) may be implemented as a part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 and/or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, and/or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 960 may visually provide information to the outside (e.g., a user) of the electronic device 901. The display device 960 may include, for example, a display, a hologram device, and/or a projector and control circuitry to control a corresponding one of the display, the hologram device, and the projector. According to one embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to one embodiment, the audio module 970 may obtain the sound via the input device 950, and/or output the sound via the sound output device 955 or a headphone of an external electronic device 902 directly (e.g., wired) or wirelessly coupled with the electronic device 701.

The sensor module 976 may detect an operational state (e.g., power or temperature) of the electronic device 901 and/or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 977 may support one or more specified protocols to be used for the electronic device 901 to be coupled with the external electronic device 902 directly (e.g., wired) or wirelessly. According to one embodiment, the interface 977 may include, for example, a high definition multimedia interface (HDMI), a universal serial bus (USB) interface, a secure digital (SD) card interface, and/or an audio interface.

A connecting terminal 978 may include a connector via which the electronic device 901 may be physically connected with the external electronic device 902. According to one embodiment, the connecting terminal 978 may include, for example, an HDMI connector, a USB connector, an SD card connector, and/or an audio connector (e.g., a headphone connector).

The haptic module 979 may convert an electrical signal into a mechanical stimulus (e.g., a vibration or a movement) and/or an electrical stimulus which may be recognized by a user via tactile sensation or kinesthetic sensation. According to one embodiment, the haptic module 979 may include, for example, a motor, a piezoelectric element, and/or an electrical stimulator.

The camera module 980 may capture a still image or moving images. According to one embodiment, the camera module 980 may include one or more lenses, image sensors, image signal processors, and/or flashes.

The power management module 988 may manage power supplied to the electronic device 901. The power management module 988 may be implemented as at least a part of, for example, a power management integrated circuit (PMIC).

The battery 989 may supply power to at least one component of the electronic device 901. According to one embodiment, the battery 989 may include, for example, a primary cell which is not rechargeable, a secondary cell which is rechargeable, and/or a fuel cell.

The communication module 990 may support establishing a direct (e.g., wired) communication channel or a wireless communication channel between the electronic device 901 and the external electronic device (e.g., the electronic device 902, the electronic device 904, and/or the server 908) and performing communication via the established communication channel. The communication module 990 may include one or more communication processors that are operable independently from the processor 920 (e.g., the AP) and may support a direct (e.g., wired) communication and/or a wireless communication. According to one embodiment, the communication module 990 may include a wireless communication module 992 (e.g., a cellular communication module, a short-range wireless communication module, and/or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth®, wireless-fidelity (Wi-Fi) direct, and/or a standard of the Infrared Data Association (IrDA)) or the second network 999 (e.g., a long-range communication network, such as a cellular network, the Internet, and/or a computer network (e.g., LAN or wide area network (WAN)). Bluetooth® is a registered trademark of Bluetooth SIG, Inc., Kirkland, Wash. These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit and/or receive a signal and/or power to and/or from the outside (e.g., the external electronic device) of the electronic device 901. According to one embodiment, the antenna module 997 may include one or more antennas, and, therefrom, at least one antenna appropriate for a communication scheme used in the communication network, such as the first network 998 and/or the second network 999, may be selected, for example, by the communication module 990 (e.g., the wireless communication module 992). The signal and/or the power may then be transmitted and/or received between the communication module 990 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 901 and the external electronic device 904 via the server 908 coupled with the second network 999. Each of the electronic devices 902 and 904 may be a device of a same type as, or a different type from, the electronic device 901. All or some of operations to be executed at or by the electronic device 901 may be executed at one or more of the external electronic devices 902, 904, or the server 908. For example, if the electronic device 901 should perform a function and/or a service automatically, or in response to a request from a user or another device, the electronic device 901, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 901. The electronic device 901 may provide the outcome, with or without further processing of the outcome, as at least a part of a reply to the request. To that end, a cloud computing, distributed computing, and/or client-server computing technology may be used, for example.

One embodiment may be implemented as software (e.g., the program 940) including one or more instructions that are stored in a storage medium (e.g., internal memory 936 or external memory 938) that is readable by a machine (e.g., the electronic device 901). For example, a processor of the electronic device 901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Herein, embodiments of the present disclosure are described in detail with reference to the accompanying drawings. It should be noted that same or similar elements may be designated by the same reference numerals/letters even though they are shown in different drawings. In the description herein, specific details such as detailed configurations and components are provided to assist with the overall understanding of the embodiments of the present disclosure. Various changes and modifications of the embodiments described herein may be made without departing from the scope of the present disclosure. Certain detailed descriptions may be omitted for clarity and conciseness.

The present disclosure provides for various modifications and various embodiments. It should be understood that the present disclosure is not limited to the various embodiments explicitly described or detailed herein, and that the present disclosure includes modifications, equivalents, and alternatives within the scope of the present disclosure.

Although terms including an ordinal number such as first, second, etc., may be used for describing various elements, the elements are not restricted by such terms. Such terms are used to distinguish one element from another element, and do not imply any specific ordering. As used herein, the term "and/or" includes any and all combinations of one or more associated items. Singular forms are intended to include plural forms unless the context clearly indicates otherwise. In the present disclosure, it should be understood that the terms "include" or "have" indicate the existence of a feature, a number, a step, an operation, a structural element, a part, or a combination thereof, and do not exclude the existence or probability of the addition of one or more other features, numbers, steps, operations, structural elements, parts, or combinations thereof.

According to one embodiment, at least one component (e.g., a manager, a set of processor-executable instructions, a program, or a module) of the above-described components may include a single entity or multiple entities. One or more of the above-described components may be omitted, or one or more other components may be added. Alternatively or additionally, a plurality of components (e.g., a manager, a set of processor-executable instructions, a program, or a module) may be integrated into a single component. In this case, the integrated component may still perform one or more functions of each of the plurality of components in the same or similar manner as they are performed by a corresponding one of the plurality of components before the integration. Operations performed by the manager, the set of processor-executable instructions, the program, the module, or another component may be carried out sequentially, in parallel, repeatedly, or heuristically, or one or more of the operations may be executed in a different order or omitted, or one or more other operations may be added.

What is claimed is:

1. A method of image processing, comprising:
determining a first feature, wherein the first feature has a dimensionality D1;
determining a second feature, wherein the second feature has a dimensionality D2 and is based on an output of a feature extraction network;
generating a third feature by processing the first feature, the third feature having a dimensionality D3;
generating a guidance by processing the second feature, the guidance having the dimensionality D3 and indicating a criterion for smoothing;
generating a filter output by applying a deep guided filter (DGF) to the third feature using the guidance as the criterion for smoothing;
generating a map based on the filter output using depth-wise separable convolutions; and
outputting a processed image based on the map;
further comprising determining the first feature based on an image to be processed such that the first feature encodes semantic information about the image to be processed, wherein the image includes a plurality of semantic areas, and the smoothing is applied in a lesser amount to a boundary between two or more of the plurality of semantic areas.

2. The method of claim 1, further comprising determining the second feature based on an image to be processed such that the second feature encodes boundary information.

3. The method of claim 1, wherein D1 is larger than D2.

4. The method of claim 1, wherein the first feature and the second feature are determined based on an image to be processed, the image to be processed has a dimensionality D4, and D4 is larger than each of D1, D2, and D3.

5. The method of claim 1, wherein:
processing the second feature comprises applying a first convolution to the second feature to generate a first convolved feature, and
outputting the processed image based on the filter output comprises aggregating the filter output with the first convolved feature.

6. The method of claim 5, wherein aggregating the filter output with the first convolved feature comprises concatenating the filter output with the first convolved feature.

7. The method of claim 5, wherein processing the second feature comprises applying a second convolution to the first convolved feature to generate a second convolved feature, and the guidance is based on the second convolved feature.

8. The method of claim 5, wherein applying the DGF to the third feature using the guidance comprises:
generating a downsampled version of the guidance;
obtaining coefficients using a filter process in which the downsampled version of the guidance is used;
upsampling the coefficients to match a dimensionality of the guidance; and
applying the coefficients to the guidance.

9. The method of claim 1, wherein applying the DGF to the third feature using the guidance comprises:
generating a downsampled version of the guidance;
obtaining coefficients using a filter process in which the downsampled version of the guidance is used;
applying the coefficients to the downsampled version of the guidance to generate a result; and
upsampling the result.

10. A system, comprising:
a processing circuit; and
a memory used to store instructions executed by the processing circuit, wherein the instructions execute a method of image processing comprising:
determining a first feature, wherein the first feature has a dimensionality D1;
determining a second feature, wherein the second feature has a dimensionality D2 and is based on an output of a feature extraction network;
generating a third feature by processing the first feature, the third feature having a dimensionality D3;
generating a guidance by processing the second feature, the guidance having the dimensionality D3 and indicating a criterion for smoothing;
generating a filter output by applying a deep guided filter (DGF) to the third feature using the guidance as the criterion for smoothing;
generating a map based on the filter output using depth-wise separable convolutions; and
outputting a processed image based on the map;
wherein when executed, the instructions further comprise determining the first feature based on an image to be processed such that the first feature encodes semantic information about the image to be processed, wherein the image includes a plurality of semantic areas, and the smoothing is applied in a lesser amount to a boundary between two or more of the plurality of semantic areas.

11. The system of claim 10, wherein when executed, the instructions further comprise determining the second feature based on an image to be processed such that the second feature encodes boundary information.

12. The system of claim 10, wherein D1 is larger than D2.

13. The system of claim 10, wherein in the method of image processing, the first feature and the second feature are determined based on an image to be processed, the image to be processed has a dimensionality D4, and D4 is larger than each of D1, D2, and D3.

14. The system of claim 10, wherein when executed, the instructions further comprise:
processing the second feature comprises applying a first convolution to the second feature to generate a first convolved feature, and
outputting the processed image based on the filter output comprises aggregating the filter output with the first convolved feature.

15. The system of claim 14, wherein when executed, the instructions further comprise: aggregating the filter output with the first convolved feature comprises concatenating the filter output with the first convolved feature.

16. The system of claim 14, wherein when executed, the instructions further comprise: processing the second feature comprises applying a second convolution to the first convolved feature to generate a second convolved feature, and the guidance is based on the second convolved feature.

17. The system of claim 14, wherein when executed, the instructions further comprise: applying the DGF to the third feature using the guidance comprises:

generating a downsampled version of the guidance;

obtaining coefficients using a filter process in which the downsampled version of the guidance is used;

upsampling the coefficients to match a dimensionality of the guidance; and applying the coefficients to the guidance.

18. The system of claim 10, wherein when executed, the instructions further comprise: applying the DGF to the third feature using the guidance comprises:

generating a downsampled version of the guidance;

obtaining coefficients using a filter process in which (i) the downsampled version of the guidance is used;

applying the coefficients to the downsampled version of the guidance to generate a result; and upsampling the result.

* * * * *